US010661156B2

(12) United States Patent
Dimitriu

(10) Patent No.: US 10,661,156 B2
(45) Date of Patent: May 26, 2020

(54) THREE DIMENSIONAL LETTERS WORD GAME COMPONENTS AND GAME METHODS OF PLAY

(71) Applicant: Dan G. Dimitriu, San Antonio, TX (US)

(72) Inventor: Dan G. Dimitriu, San Antonio, TX (US)

(*) Notice: Subject to any disclaimer, the term of this patent is extended or adjusted under 35 U.S.C. 154(b) by 0 days.

(21) Appl. No.: 15/486,278

(22) Filed: Apr. 12, 2017

(65) Prior Publication Data

US 2017/0348588 A1    Dec. 7, 2017

Related U.S. Application Data

(60) Provisional application No. 62/321,593, filed on Apr. 12, 2016.

(51) Int. Cl.
| | |
|---|---|
| *G09B 1/00* | (2006.01) |
| *A63F 9/00* | (2006.01) |
| *A63F 1/04* | (2006.01) |
| *G09B 19/00* | (2006.01) |
| *A63F 3/00* | (2006.01) |
| *A63F 3/06* | (2006.01) |
| *A63F 3/04* | (2006.01) |

(52) U.S. Cl.
CPC ............. *A63F 9/0098* (2013.01); *A63F 1/04* (2013.01); *A63F 3/00697* (2013.01); *A63F 3/0423* (2013.01); *A63F 3/062* (2013.01); *G09B 19/00* (2013.01); *A63F 2001/0408* (2013.01); *A63F 2003/00794* (2013.01)

(58) Field of Classification Search
USPC ..... 434/128, 129, 159–161, 172; 273/157 R, 273/269, 272
See application file for complete search history.

(56) References Cited

U.S. PATENT DOCUMENTS

| | | | | |
|---|---|---|---|---|
| RE2,528 | E * | 3/1867 | Hill ............................ | 434/159 |
| 2,286,368 | A * | 6/1942 | May ...................... | G09B 19/02 273/447 |
| 2,444,768 | A * | 7/1948 | Eby .......................... | A63F 3/04 174/30 |
| 3,853,321 | A * | 12/1974 | Claffie ................. | A63F 3/0423 273/239 |
| 4,802,854 | A * | 2/1989 | Davis .................... | A63F 9/0098 434/159 |
| 4,966,366 | A * | 10/1990 | Mercado-Torres ......................... | A63F 9/0098 273/146 |

(Continued)

*Primary Examiner* — Kurt Fernstrom
(74) *Attorney, Agent, or Firm* — Kammer Browning PLLC

(57) ABSTRACT

A game apparatus and game methods of play that provide mental exercises to increase the level of abstract thinking to create 3-D objects from universally accepted 2-D patterns. Since we read and write on 2-D surfaces, the shapes we associate most with a 2-D environment are alphanumeric characters. Combining letters and numbers in a 3-D environment creates challenging exercises for visualizing 3-D shapes. The competitive games involve a series of 3-D manipulative modules. Play of the games involves scoring points for creating and/or discerning words made up of letters recognized from the 3-D manipulative modules. The games are for multiple players and can also be implemented electronically and online.

11 Claims, 14 Drawing Sheets

(56) References Cited

U.S. PATENT DOCUMENTS

| | | | | |
|---|---|---|---|---|
| 5,167,503 | A | * | 12/1992 | Jordan ................ A63F 3/00006 |
| | | | | 273/146 |
| 5,653,593 | A | * | 8/1997 | Berlinski ................... A63F 7/40 |
| | | | | 434/159 |
| 5,743,740 | A | * | 4/1998 | Visser ................... A63F 3/0423 |
| | | | | 273/269 |
| 5,947,741 | A | * | 9/1999 | Villarreal ............... A63F 9/0415 |
| | | | | 434/159 |
| 6,135,851 | A | * | 10/2000 | Drake ................. A63H 33/062 |
| | | | | 273/243 |
| 6,692,002 | B2 | * | 2/2004 | Kummer ............... A63F 3/0423 |
| | | | | 273/146 |
| 6,786,729 | B2 | * | 9/2004 | Lee .......................... G09B 1/30 |
| | | | | 434/159 |

* cited by examiner

THREE DIMENSIONAL LETTERS WORD GAME COMPONENTS AND GAME METHODS OF PLAY

CROSS REFERENCE TO RELATED APPLICATIONS

This application claims the benefit under Title 35 United States Code § 119(e) of U.S. Provisional Patent Application Ser. No. 62/321,593; Filed: Apr. 12, 2016; the full disclosure of which is incorporated herein by reference.

BACKGROUND OF THE INVENTION

1. Field of the Invention

The present invention relates generally to games and educational tools. The present invention relates more specifically to game components and a multiplayer game method of play that facilitates three-dimensional recognition skills.

2. Description of the Related Art

The ability to visualize in a 3-D environment is an essential skill for communication through graphics. It has been defined as "the ability to mentally imagine, understand, rotate, and manipulate 3-D geometric objects". Spatial skills are very important for a large variety of careers. There are at least 84 career areas for which spatial skills are considered important. Studies have also shown that spatial visualization skills are a strong predictor of the success and confidence of students in various fields of study.

The present invention provides a new type of training exercise to help students increase the level of abstract thinking to create 3-D objects from universally accepted 2-D flat patterns. Since we read and write on 2-D surfaces, the shapes we associate most with a 2-D environment are alphabetic letters. Combining letters in a 3-D environment creates extremely challenging exercises for visualizing 3-D shapes.

The exercises presented herein involve a series of 3-D manipulatives that provide the modules contained in the present game and game method of play. The game is for multiple players and can also be developed to be played electronically and on-line.

BRIEF DESCRIPTION OF THE DRAWINGS

FIG. 41 is a plan view of the additional printed score card component used with the category word guessing embodiment of the game method of play of the present invention.

FIG. 42 is a plan view of the additional printed score card component used with the construct a word embodiment of the game method of play of the present invention.

DETAILED DESCRIPTION OF THE PREFERRED EMBODIMENTS

A number of games are provided that each utilizes the core game pieces of the present invention, namely a set of 3-D letter modules that each represents at least three letters of the alphabet when viewed from different angles. What follows are descriptions of a representative set of thirty-six letter modules suitable for the play of the games of the present invention. Sets of modules that number more or fewer are anticipated although the preference is for a set having twenty-four to forty-eight modules. Alternate individual modules are also anticipated. That is, the thirty-six modules described herein are not the only combinations of three or four letters that can be constructed into a single 3-D module. Other combinations are anticipated. These include alphabetic characters and/or numeric characters. As can be seen in the appended drawing figures, the overall approximate cube shape of each open structure module defines at least six specific orientations where alphanumeric characters are potentially discernable, each specific orientation visually presenting structural elements of the module that potentially contribute to the formation of a visually discernable alphanumeric character, and visually hiding structural elements of the letter module that detract from the formation of the visually discernable alphanumeric character. The at least six specific orientations define axes for visualization of alphanumeric characters and rotation of the open structure module about one such defined axis presents two or more distinct alphanumeric characters.

Figure 1:
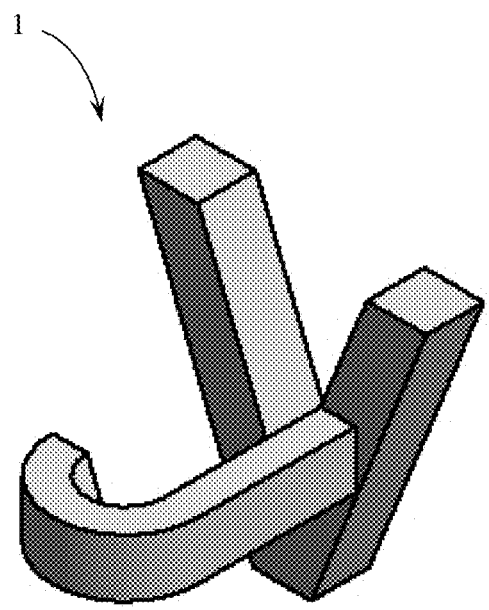
FIGS. 1-36 are perspective views of representative 3-D letter modules of the game components of the present invention.
Figure 2:
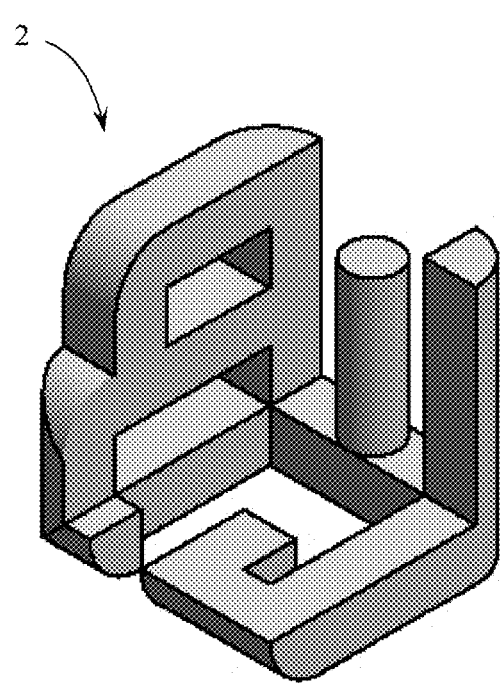
Figure 3:
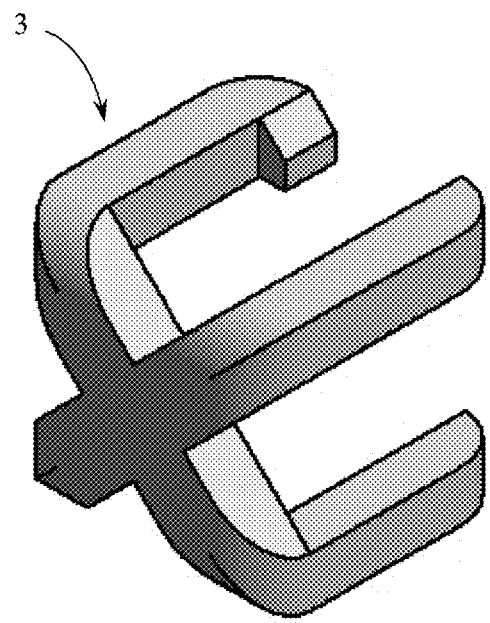
Figure 4:
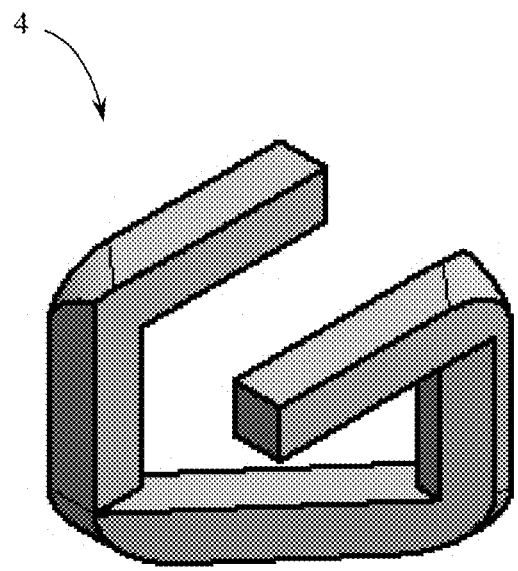

FIG. 1 is a perspective view of the AJT module 1 of the game components of the present invention. FIG. 2 is a perspective view of the BEG module 2 of the game components of the present invention. FIG. 3 is a perspective view of the CUX module 3 of the game components of the present invention. FIG. 4 is a perspective view of the DNU module 4 of the game components of the present invention.

Figure 5:
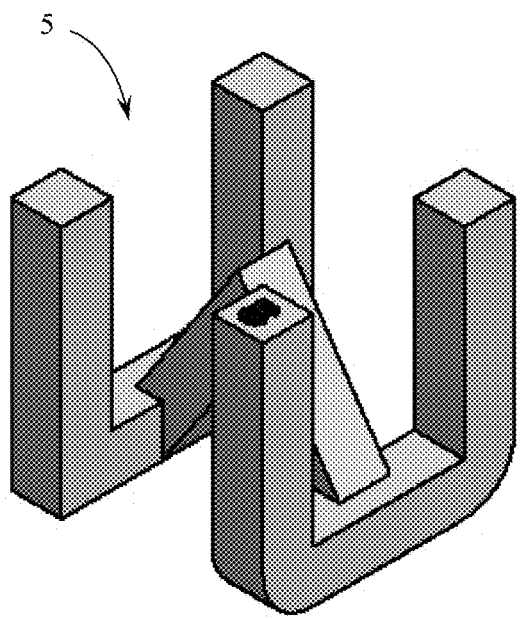
Figure 6:
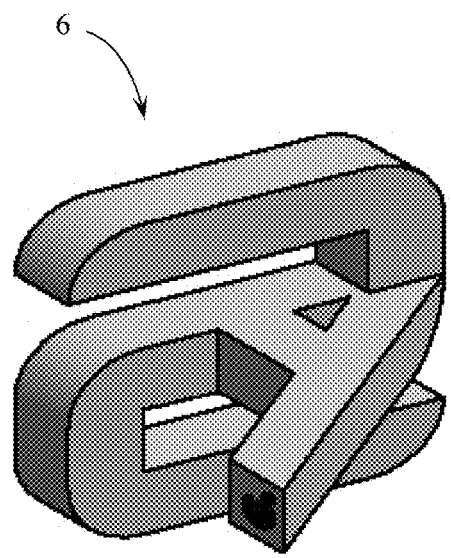
Figure 7:
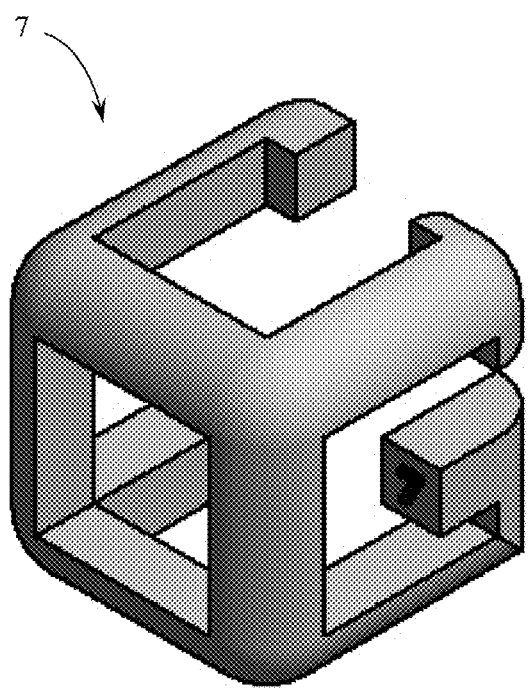
Figure 8:
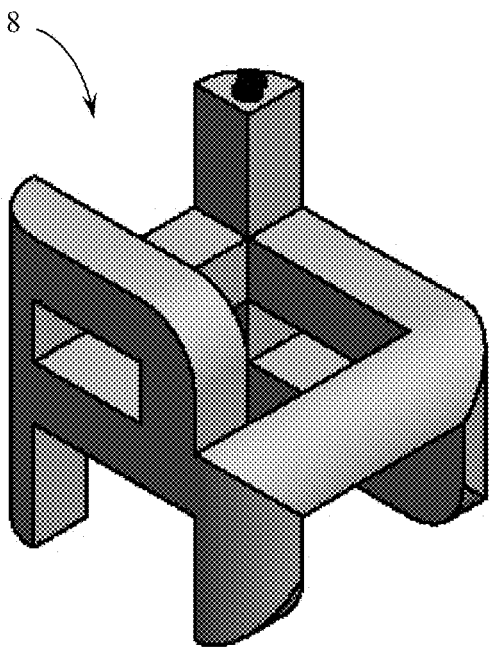

FIG. 5 is a perspective view of the EMH module 5 of the game components of the present invention. FIG. 6 is a perspective view of the SAT module 6 of the game components of the present invention. FIG. 7 is a perspective view of the GCO module 7 of the game components of the present invention. FIG. 8 is a perspective view of the HOB module 8 of the game components of the present invention.

Figure 9:
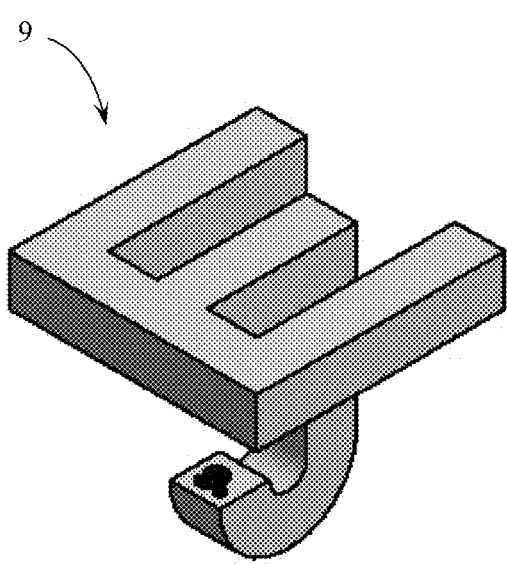
Figure 10:
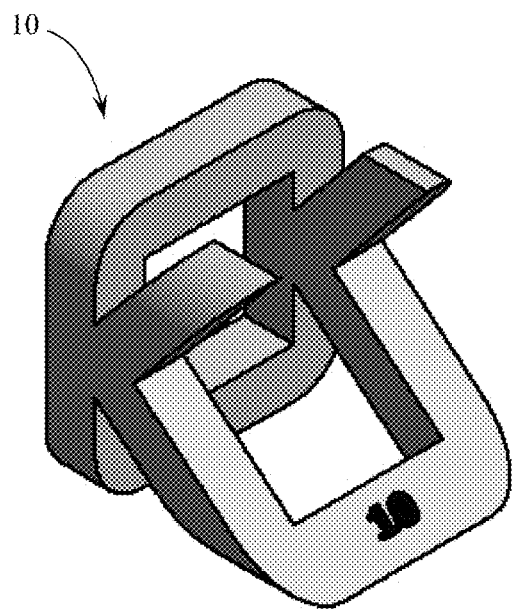
Figure 11:
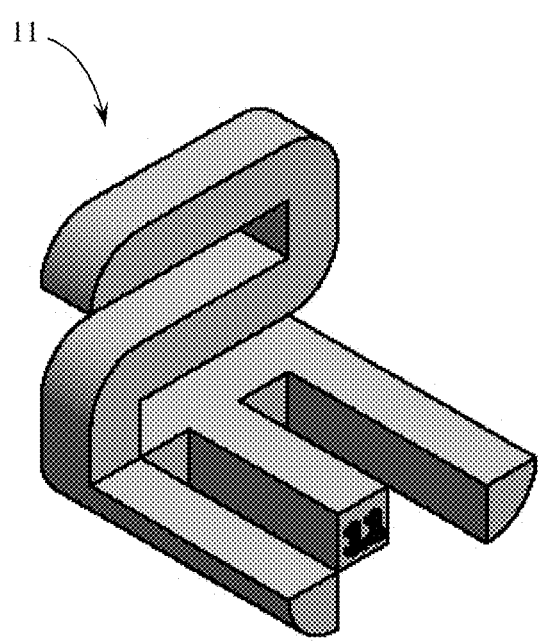
Figure 12:
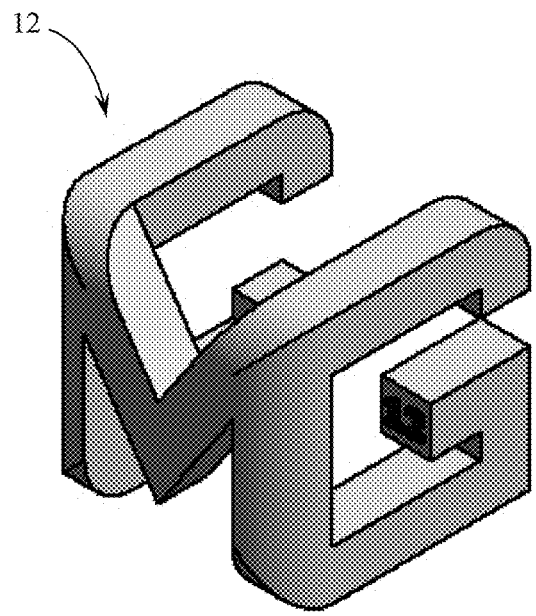

FIG. 9 is a perspective view of the JET module 9 of the game components of the present invention. FIG. 10 is a perspective view of the KDO module 10 of the game components of the present invention. FIG. 11 is a perspective view of the LSE module 11 of the game components of the present invention. FIG. 12 is a perspective view of the MUG module 12 of the game components of the present invention.

Figure 13:
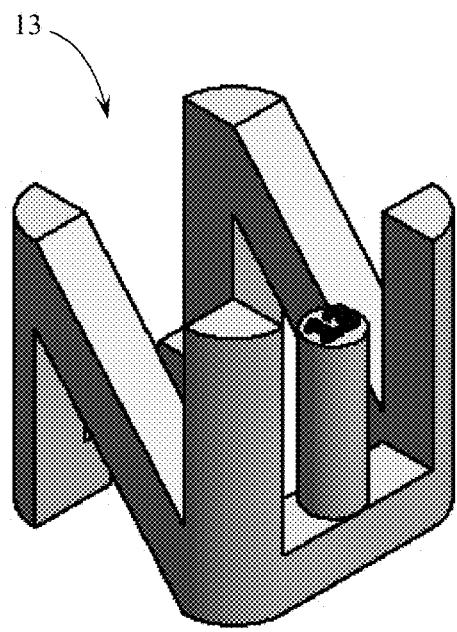
Figure 14:
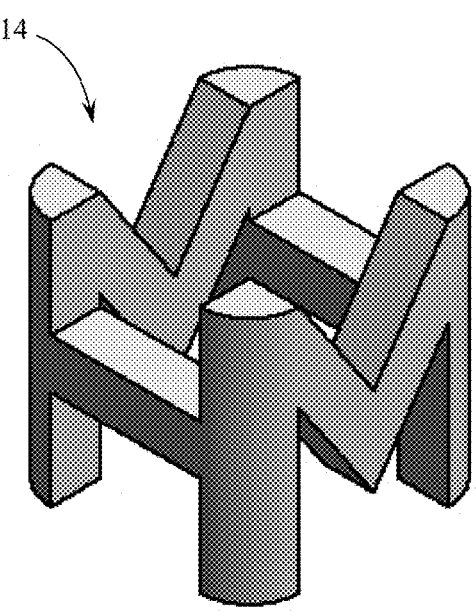
Figure 15:
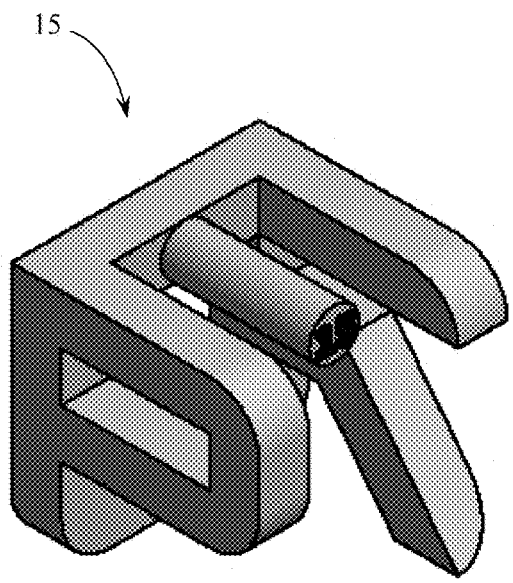
Figure 16:
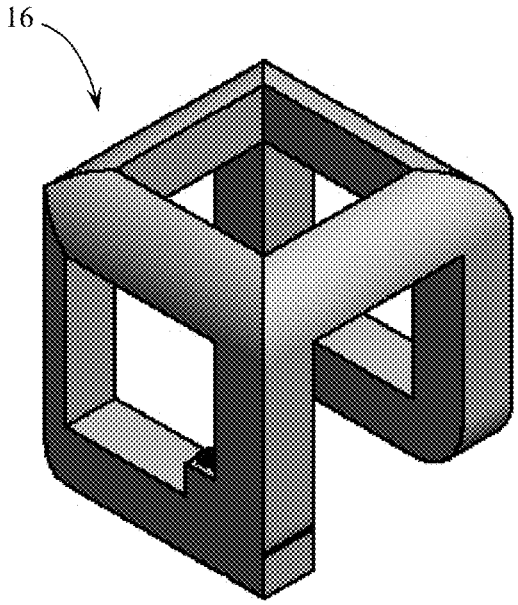

FIG. 13 is a perspective view of the NCE module 13 of the game components of the present invention. FIG. 14 is a perspective view of the OHM module 14 of the game components of the present invention. FIG. 15 is a perspective view of the RED module 15 of the game components of the present invention. FIG. 16 is a perspective view of the QUD module 16 of the game components of the present invention.

Figure 17:
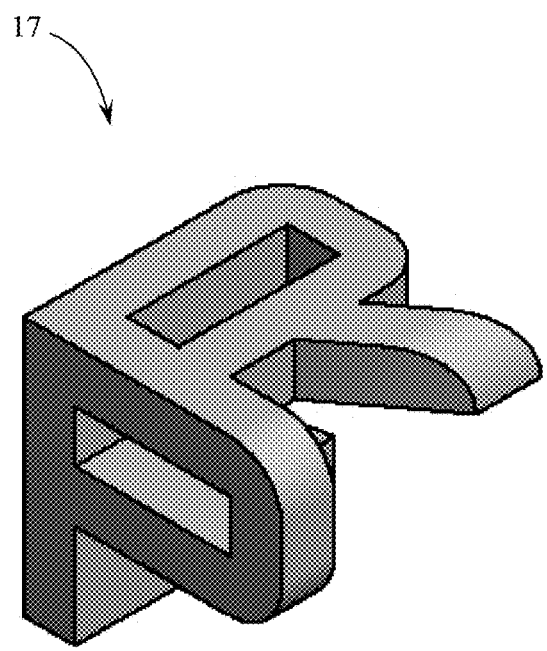
Figure 18:
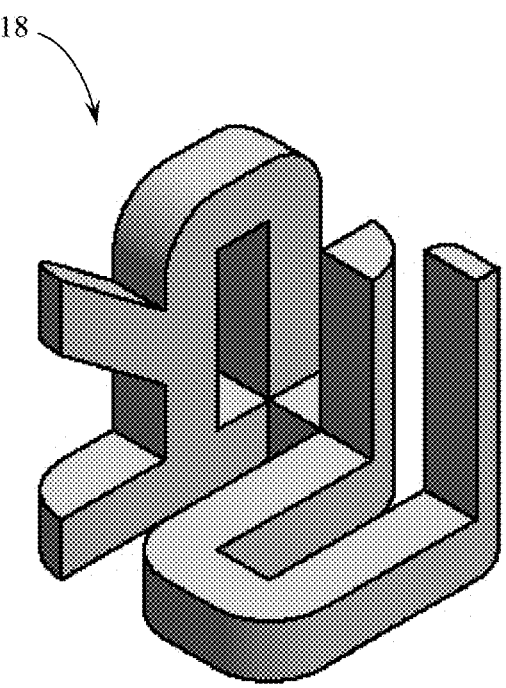
Figure 19:
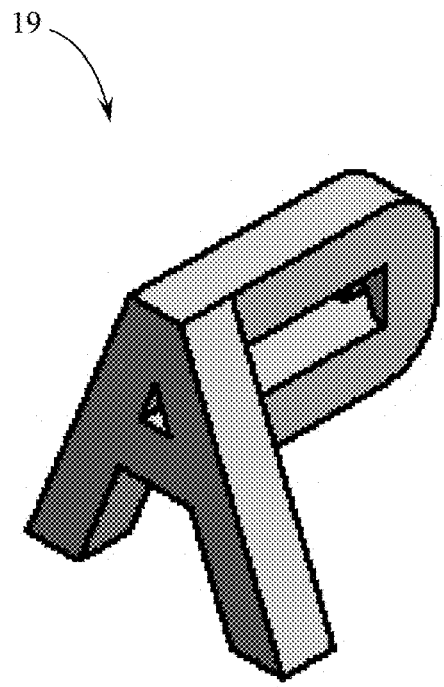
Figure 20:
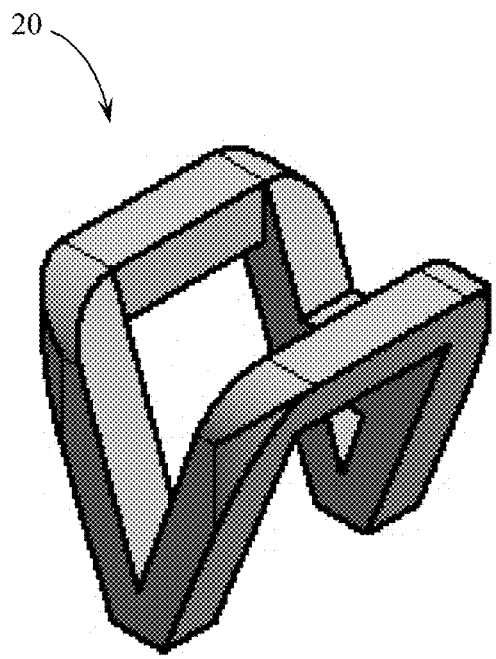

FIG. 17 is a perspective view of the PER module 17 of the game components of the present invention. FIG. 18 is a perspective view of the SRE module 18 of the game components of the present invention. FIG. 19 is a perspective view of the TAP module 19 of the game components of the present invention. FIG. 20 is a perspective view of the UAO module 20 of the game components of the present invention.

Figure 21:
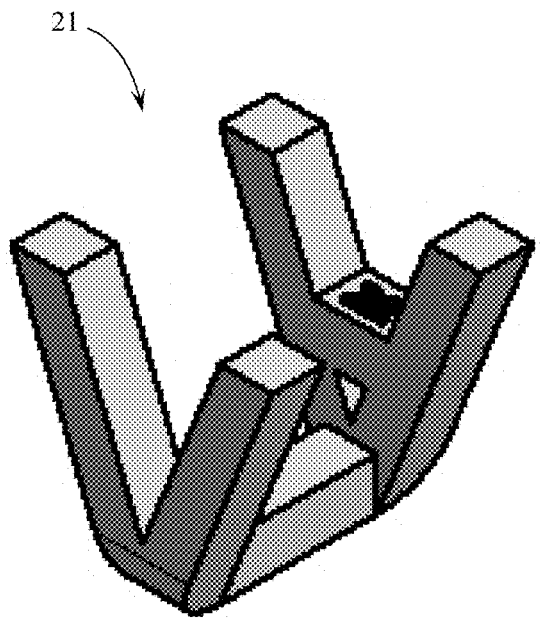
Figure 22:
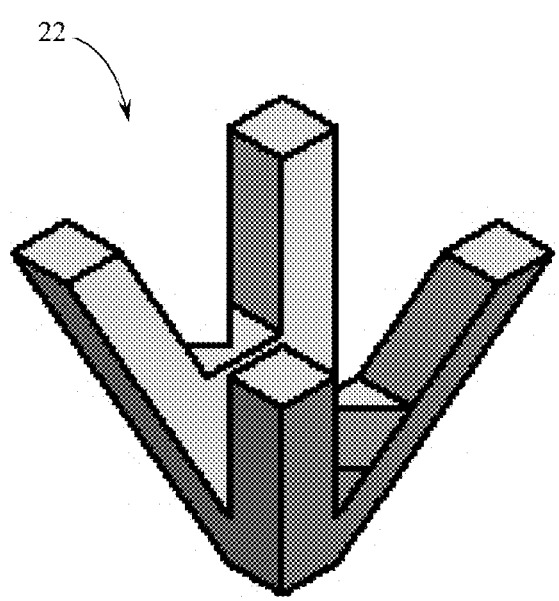
Figure 23:
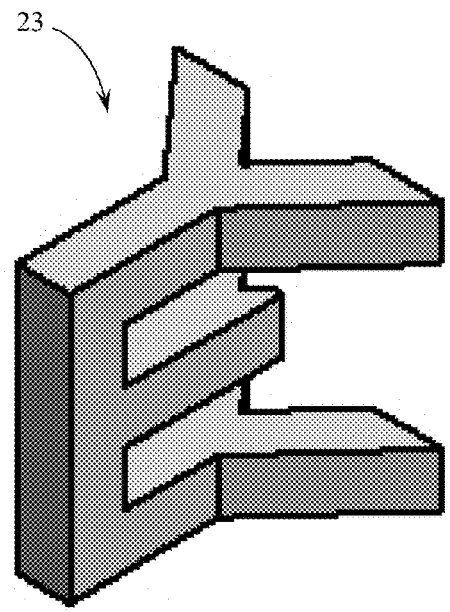
Figure 24:
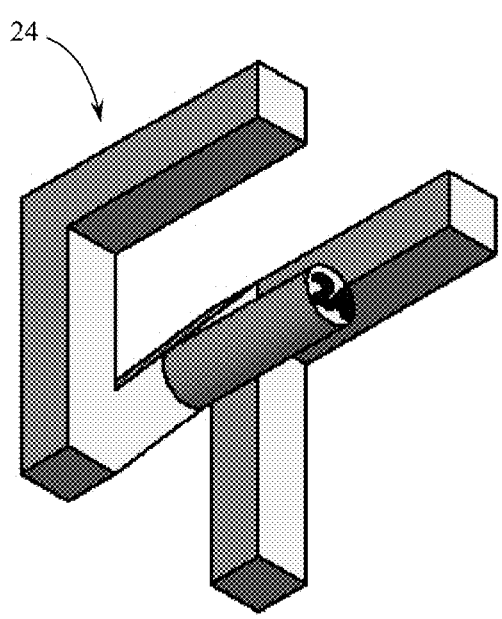

FIG. 21 is a perspective view of the VUH module 21 of the game components of the present invention. FIG. 22 is a perspective view of the XAV module 22 of the game components of the present invention. FIG. 23 is a perspective view of the YEH module 23 of the game components of the present invention. FIG. 24 is a perspective view of the FEZ module 24 of the game components of the present invention.

Figure 25:
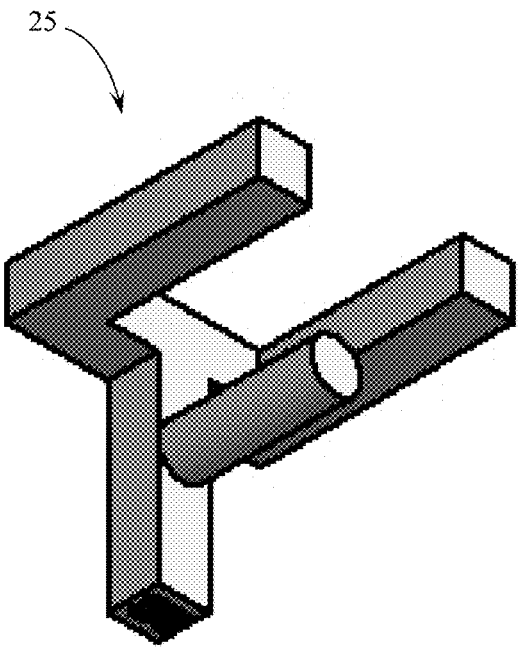
Figure 26:
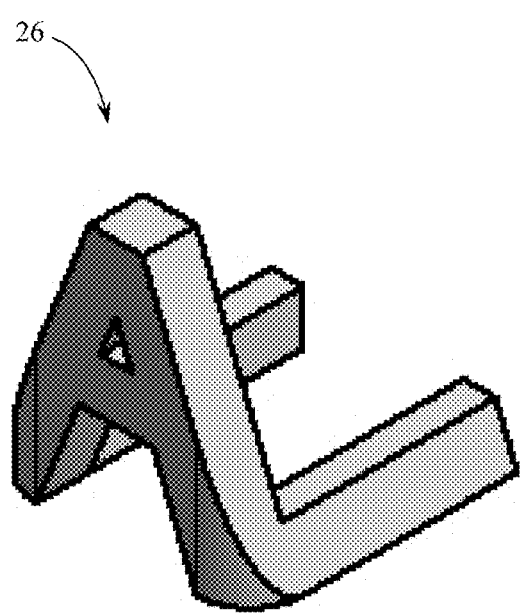
Figure 27:
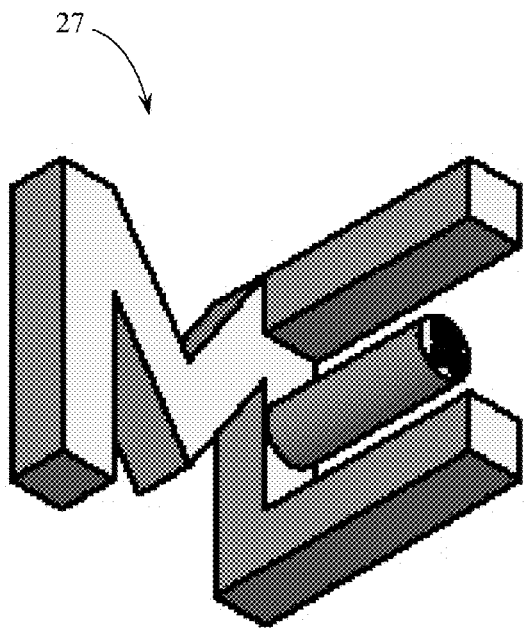
Figure 28:
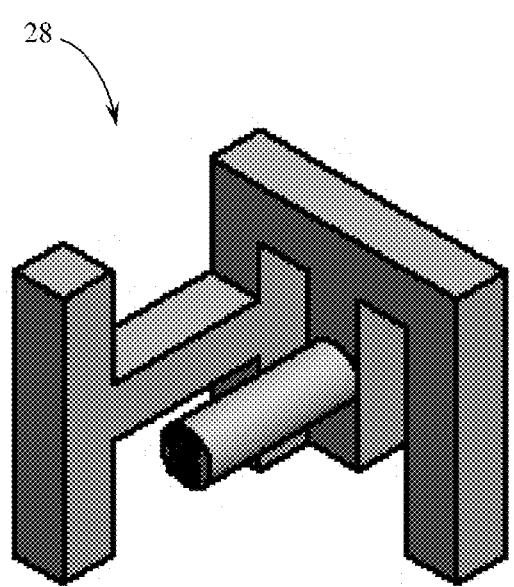

FIG. 25 is a perspective view of the EFT module 25 of the game components of the present invention. FIG. 26 is a perspective view of the AUL module 26 of the game components of the present invention. FIG. 27 is a perspective view of the ELM module 27 of the game components of the present invention. FIG. 28 is a perspective view of the HEF module 28 of the game components of the present invention.

Figure 29:
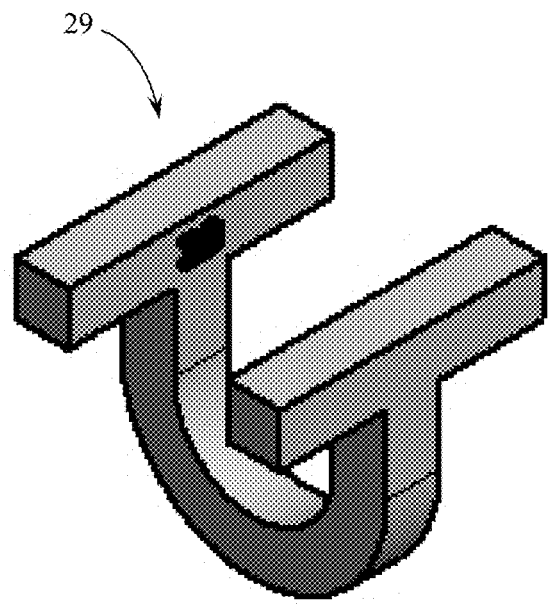
Figure 30:
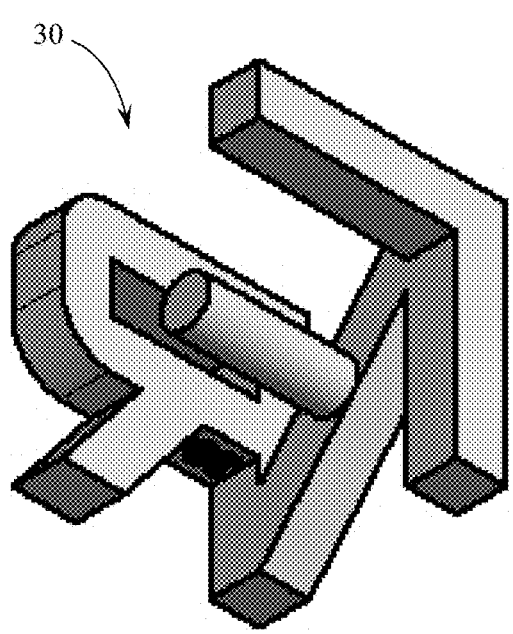
Figure 31:
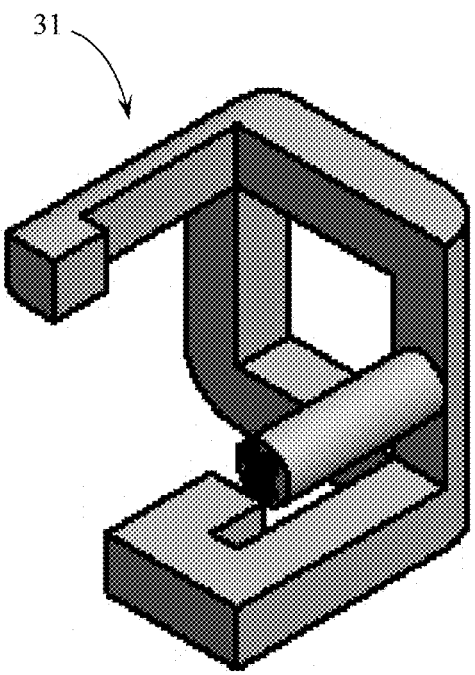
Figure 32:
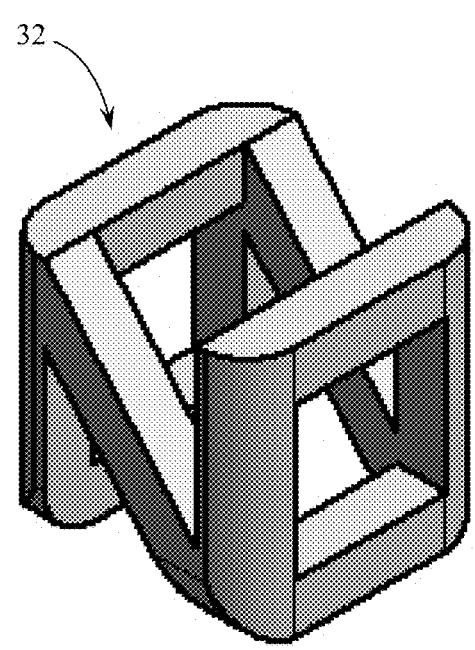

FIG. 29 is a perspective view of the HUT module 29 of the game components of the present invention. FIG. 30 is a perspective view of the REN module 30 of the game components of the present invention. FIG. 31 is a perspective view of the DEG module 31 of the game components of the present invention. FIG. 32 is a perspective view of the NOD module 32 of the game components of the present invention.

Figure 33:
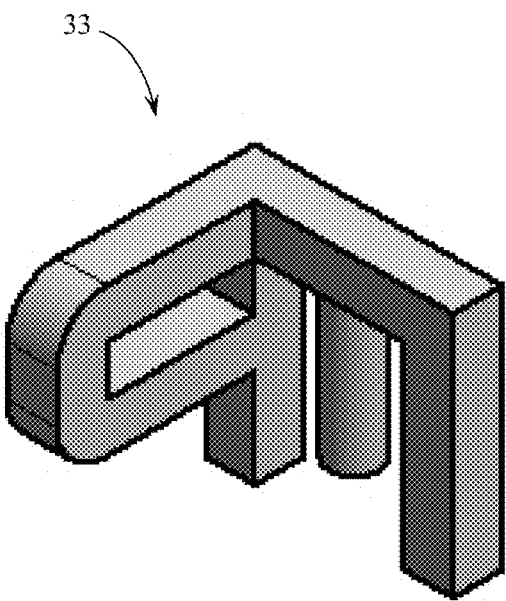
Figure 34:
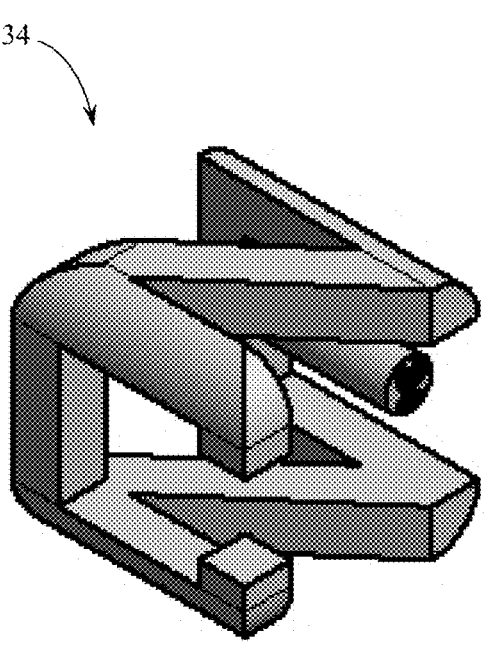
Figure 35:
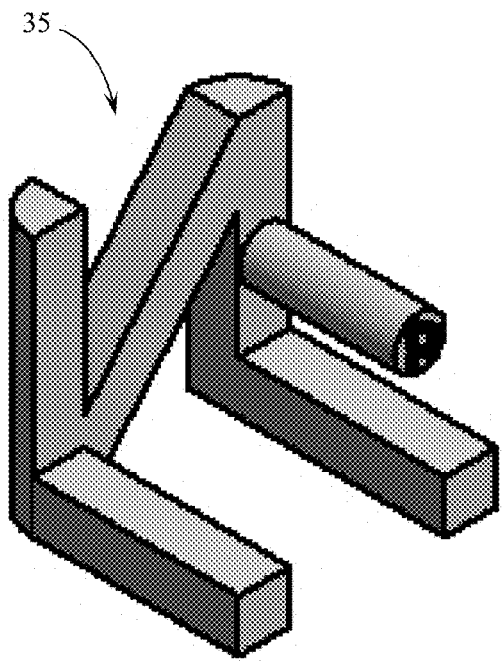
Figure 36:
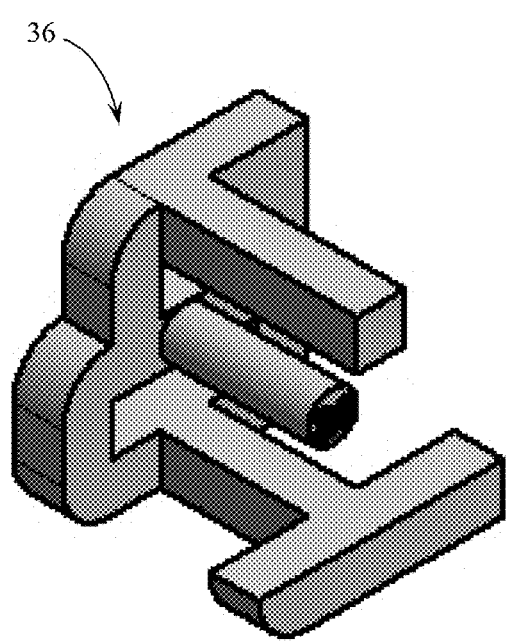

FIG. 33 is a perspective view of the PEL module 33 of the game components of the present invention. FIG. 34 is a perspective view of the NOE module 34 of the game components of the present invention. FIG. 35 is a perspective view of the FUN module 35 of the game components of the present invention. FIG. 36 is a perspective view of the HEB module 36 of the game components of the present invention.

The games are played with 3-D letter modules in several ways. Three such games: (a) a letter cards game; (b) an alphabet bingo game; and (c) a word/phrase guessing game, are for the beginner level with increasing degrees of difficulty. At the beginner level the players get familiar with the game concept, the letters, and begin to build their 3-D visualization skills. Two additional games: (d) a category word guessing game; and (e) a construct a word game, are for more advanced players that are already familiar with the modules in general and are ready to play word games to consolidate 3-D visualization skills while providing opportunities to enrich and diversify players' vocabulary.

Figure 37:
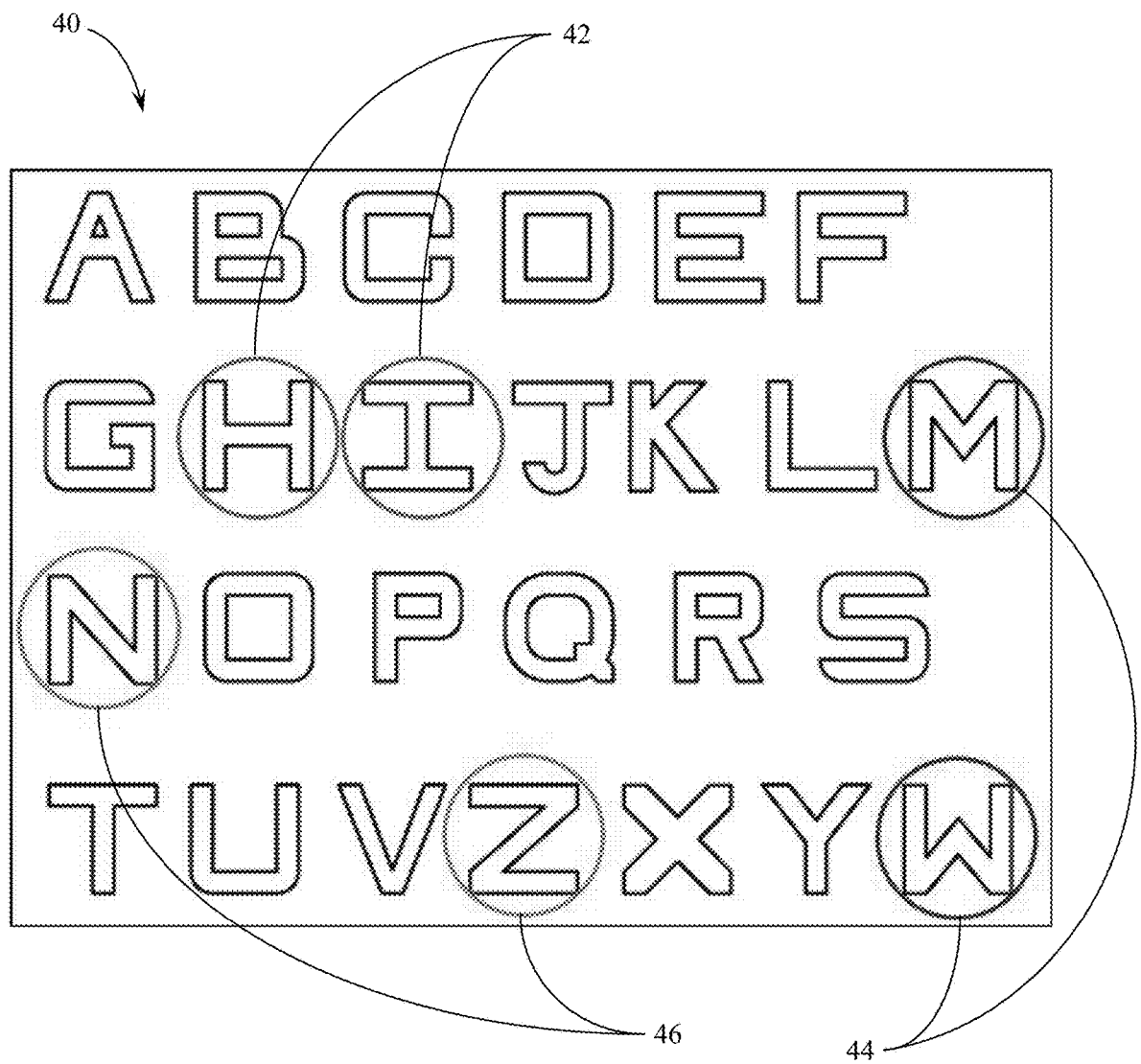
FIG. 37 is a plan view of the visual 2-D block representations of the 26 letters of the alphabet used (as an example) in the preferred embodiments of the present invention.

As shown in the 2-D panel 40 of FIG. 37, the letter modules are designed to show a different letter contour when viewed from a different angle. Three pairs of letters have the same contours but through simple rotation perform a dual role in the alphabet. These include the letters H & I (views 42), the letters M & W (views 44), and the letters N & Z (views 46). The letter modules therefore provide a game apparatus assembly for implementation of a competitive game of skill played between two or more players, the skill comprising an ability to discern two-dimensional alphanumeric characters from open structure, visually complex three-dimensional objects. The open structure three-dimensional letter modules each have maximum height, width, and depth dimensions that overall approximate a cube in shape. Each letter module is further configured to visually present two, three, or four separate discernable alphanumeric characters only when the module is specifically oriented and/or is viewed from a specific angle, and to visually present structures generally indiscernible as alphanumeric characters when the module is viewed in other orientations.

The components of the preferred embodiment of the basic game set include: thirty-six 3-D letter modules each incorporating at least three different recognizable letters; sixty-four letter cards (two cards for each of the twenty-six letters of the alphabet plus eight extras); thirty-two 5×5 array alphabet bingo cards; a number of bingo marker rings; one or more pads of blank formatted phrase guessing game play sheets; a number of word lists with the most common words made out of four, five, six, seven, and eight letters; a number of blank formatted score cards for the category word guessing game (printed on both faces); and a number of blank formatted score cards for the construct a word game (printed on both faces).

Preferably a number of ancillary components are provided with the game components to include: a game box containing; pencils with erasers; pencil sharpener; and an opaque bag to hold all modules.

Figure 38:
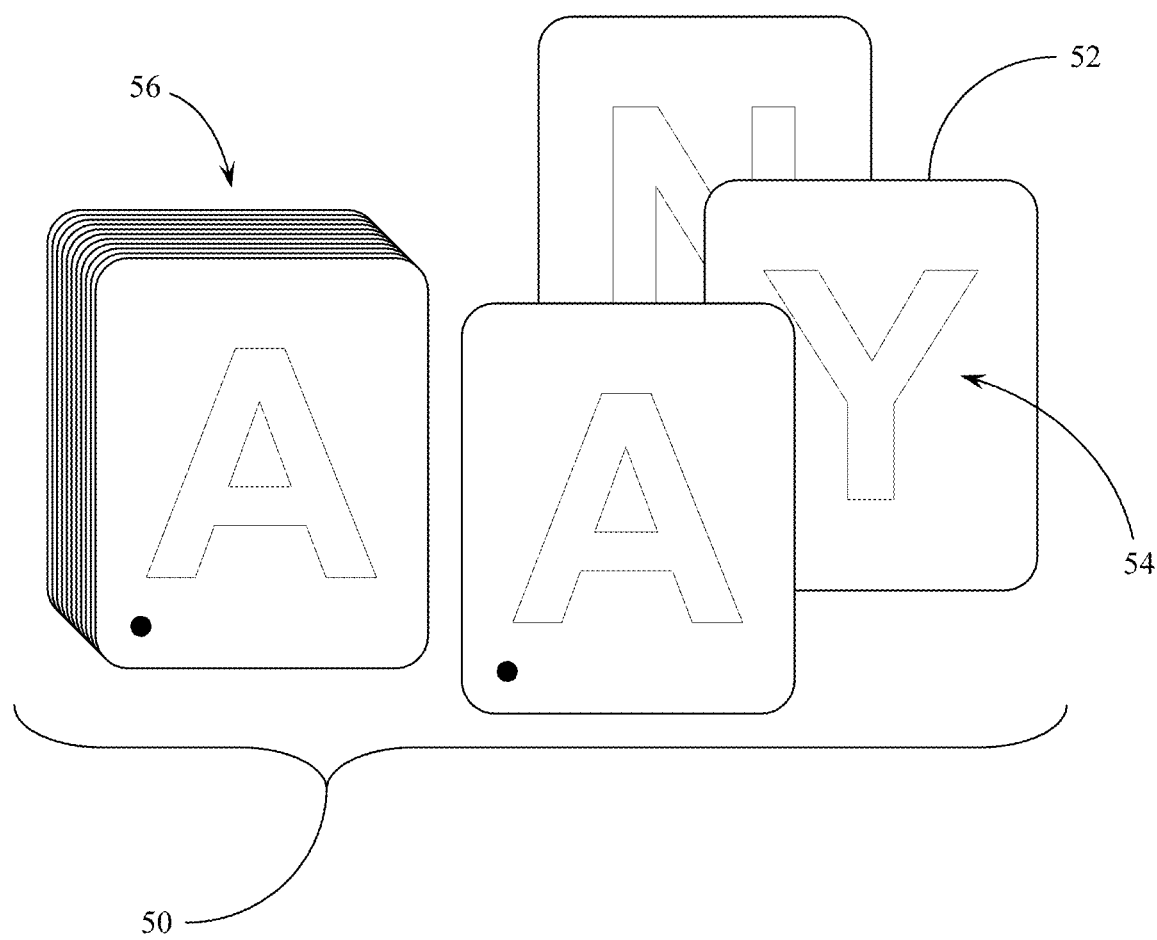
FIG. 38 is a plan assembly view of the additional components used with the letter cards embodiment of the game method of play of the present invention.

The Letter Card Game (FIG. 38)

The easiest and fastest way to get acquainted with the 3-D letter modules is to play the letter card game embodiment of the present invention using the additional components 50 shown in FIG. 38. In this embodiment, a letter card 52 is drawn from a deck of cards 56 and each player finds the letter 54 in their modules (see FIGS. 1-36). Score cards are not needed for this game. All letter cards are shuffled and placed in a stack. From the beginning the players determine how many rounds will be in the game and how many modules will be individually drawn for a game. It is suggested that the number of rounds matches the number of players or a multiple thereof.

One of the players is selected as a referee either for the entire game or the players will take turns being referee for each round. The referee makes the final decision in any letter dispute. All modules are in the bag and the players draw the same number of modules from it, one at a time, and place them on the table in front of them. The referee reveals the top letter card from the deck 56. The players check their modules and the first player to show a module containing the letter gains one point, takes the card, and places it under the respective module.

If there is no match the play continues and the next letter card is revealed. The players again check their modules and the first to announce a match gains one point, takes the card, and places it under the respective module. A module might have multiple cards depending on the letters played. If there is no match again the play continues until there is one and the card is placed under the respective module. If a letter previously claimed by a player comes up again it cannot be claimed again by the same player for the same module. The first player to have all the modules paired with at least three cards may close the game and earns one point for closing, but the winner is the player with the most points so, at times, it is advisable to postpone the closing in order to gain more points if the modules have more than three letters.

Once the round is over all the letters are returned to the stack and the modules are returned into the bag. A new set of modules is drawn for the next round. All subsequent rounds are played following the same rules. After all rounds are played the player with most points wins. If there are two or more players with the same number of points a tie-breaker play will have them use only one module and the first letter match will determine the winner.

Figure 39:
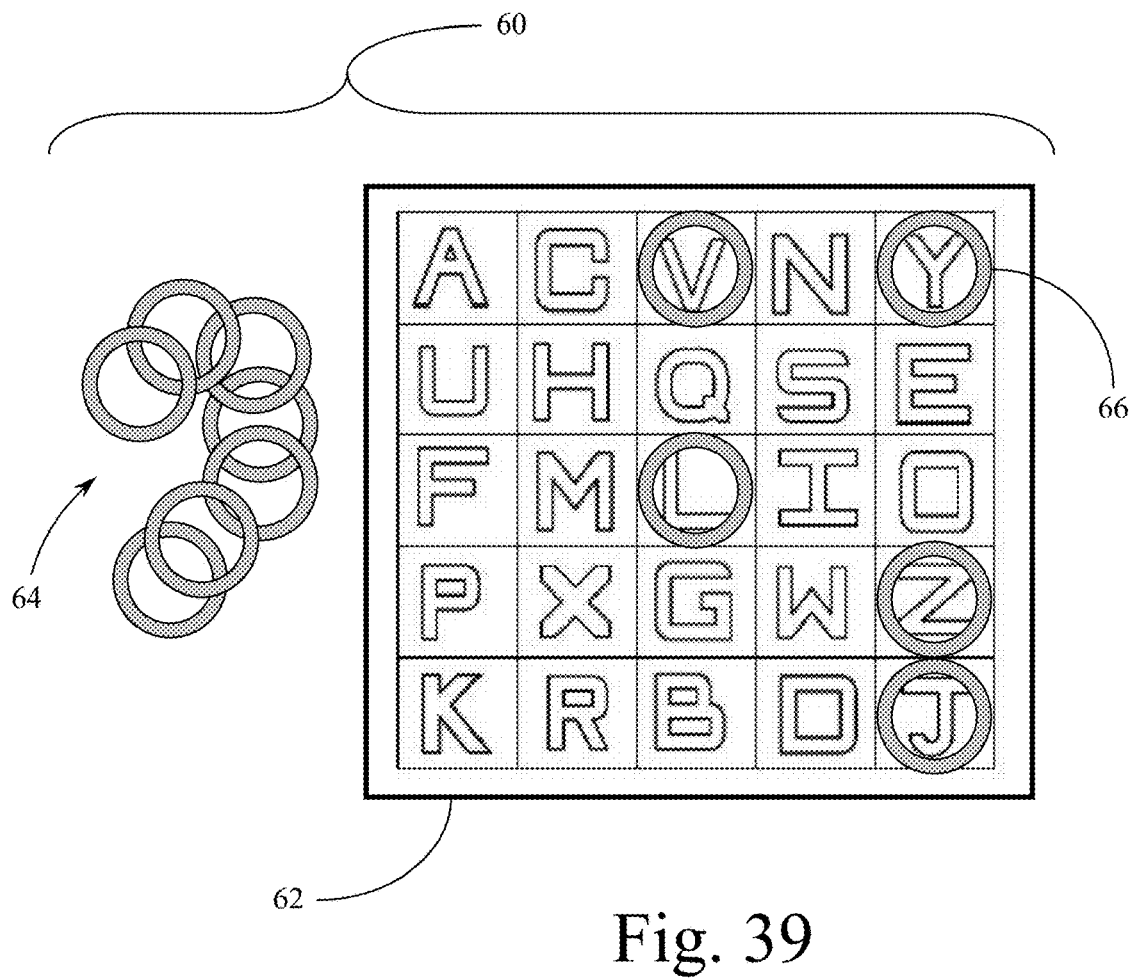
FIG. 39 is a plan assembly view of the additional components used with the alphabet bingo embodiment of the game method of play of the present invention.

The Alphabet Bingo Game (FIG. 39)

This is the next level game that can be used to help players get better acquainted with 3-D letter modules and uses the additional components 60 shown in FIG. 39. Score cards are not needed for this game. Special 5×5 letter array bingo-type cards 62 and marker rings 64 are used for this game. Each player should have one bingo-type card 62. One of the players is selected as referee either for the entire game or the players will take turns being referee for each round. The referee makes the final decision in any letter dispute.

All modules are in the bag and the players take turns to draw one module each from it. Once a player draws a module he/she calls the letters observed in the module and places the module in the common area. All players put a ring 66 on each of the announced letters. If another player observes a letter that has not been announced in any of the played modules, only he/she can put a ring on that letter if the letter is on her/his card. The referee must validate any disputed call. A letter can have only one ring 66. The first player to have rings on all five letters in a line, column, or on a diagonal and calls "Bingo!" is the winner of the game.

Figure 40:
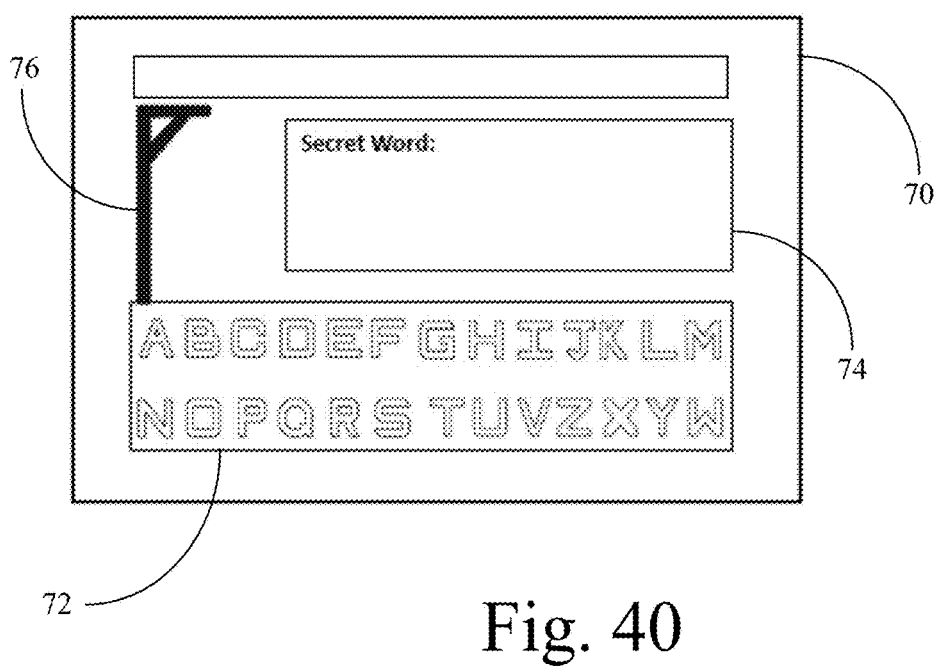
FIG. 40 is a plan view of the additional printed sheet component used with the phrase guessing embodiment of the game method of play of the present invention.

The Word/Phrase Guessing Game (FIG. 40)

The word/phrase guessing game is another introductory level game that can be used to help players get better acquainted with 3-D letter modules. This game is for two players. All modules are out on the table. One phrase guessing sheet 70 is used for each game. Player One thinks of a secret word (or short phrase) and draws a line in field 74 on sheet 70 for each letter of the word and then selects modules (FIGS. 1-36) containing those letters and lines them in front of Player Two. Player One can follow different strategies. She/he can choose modules containing multiple letters from the secret word or a module for each letter. If the secret word can be spelled with fewer modules, Player One may add other, not related, decoy modules up to the total number of letters spelling the secret word.

Player Two inspects the lined up modules, identifies the letters, and circles them in the field 72 on the pad 70. Since some modules might contain more than three letters there might be letters not identified by the player that would complicate the word or phrase guessing. Using the identified letters Player Two attempts to figure out the secret word by calling one letter at a time. Once a letter is called it is crossed out from the list. If a letter is correctly guessed, it is written on the appropriate line or lines by Player One. For each guessed letter that is not contained in the secret word a body part is drawn on the gallows 76. There are six body parts that can be used (head, trunk, two hands, and two legs) so Player Two has six chances to guess the secret word. If all the letters in the secret word are guessed before the complete body is drawn Player Two wins the game. If not, Player One wins the game and the secret word with the modules containing all the secret word letters must be revealed.

Figure 41:
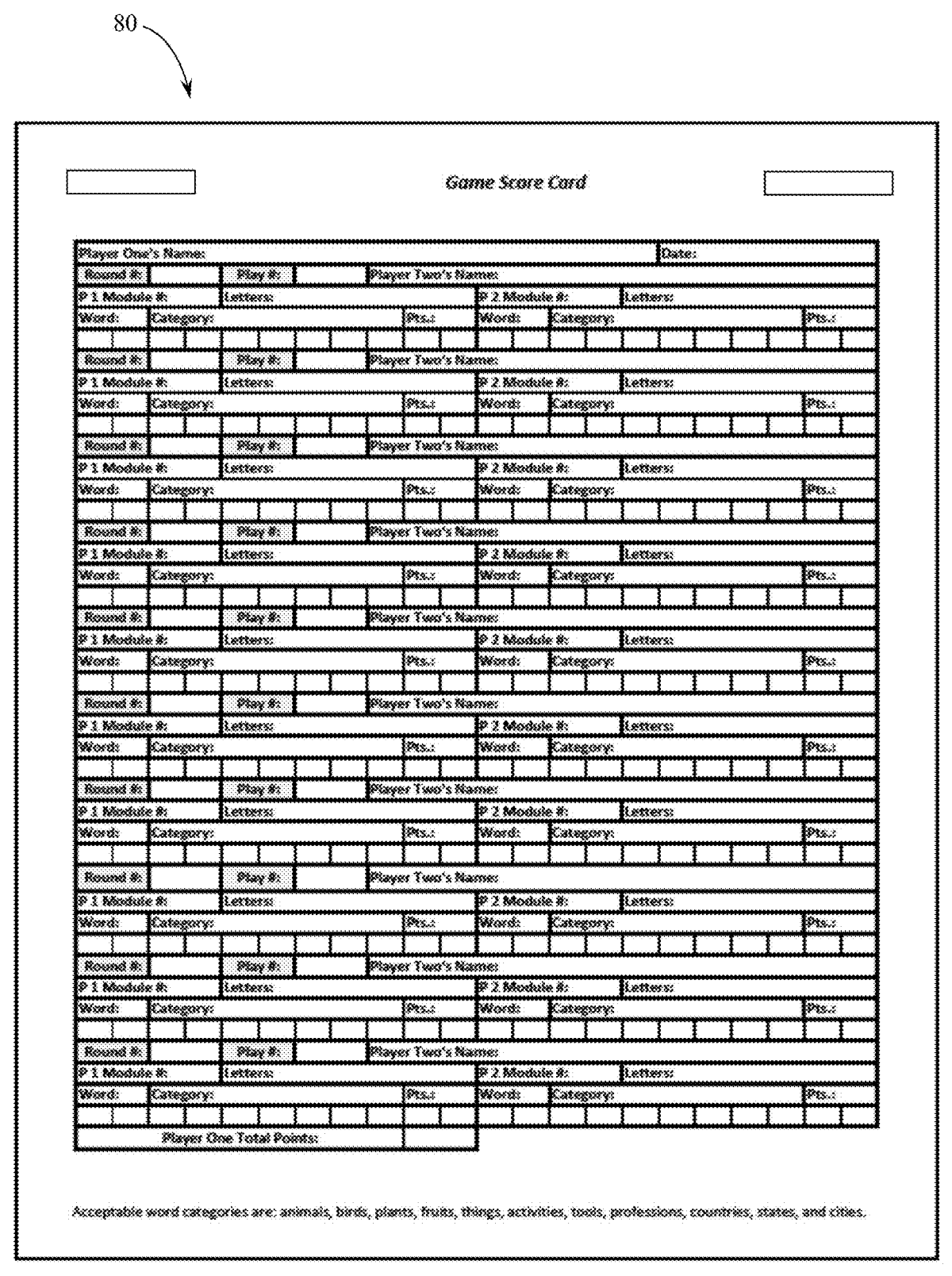

The Category Word Guessing Game (FIG. 41)

This is a game with a higher level of complexity that is best played by an even number of players that are forming pairs. The game may have multiple rounds with equal number of plays and their number should be established from the beginning. A round has the number of plays determined by the number of different pairs that can be formed with the participating players. After each play the pairs are rearranged until every player has been paired with every other player. Then the turn is over and another turn may start.

Each player draws a module (FIGS. 1-36) and selects from an acceptable category a word containing all the letters detected in the module. A preferred set of acceptable categories are: animals, birds, plants, fruits, things, activities, tools, professions, countries, states, and cities. Each player uses game score card 80. All modules are placed in an opaque bag. One of the players is selected as referee either for the entire game or the players will take turns being referee for each round. The referee makes the final decision in any letter dispute. Each participating player draws a module and within an established time interval (preferably two to three minutes) selects from an acceptable category a word containing all the letters present in the module. A more challenging variation of the game would require that the selected word must also start with one of the module letters. Once the words are selected the players within the pair exchange the modules and inform their partners of the word category they selected. The players have an allotted amount of time (again, two to three minutes) to figure out the selected word.

Each play carries four points per pair to be awarded as follows: a player in the pair finds the correct word—wins two points and zero points for the opponent; a player finds a word that respects all the conditions but it is not the selected word—wins one point and the opponent wins one point; a player finds no word to match the conditions—wins zero points and two points for the opponent; if a player cannot find an initial word for the letters detected in the drawn module receives zero points and exchanges the module with the opponent, if the opponent then finds a word to match the letters he/she receives two points; and if a player detects letters missed by the opponent wins two points while the opponent receives zero. Score is kept on the score card 80.

After each play the drawn modules are retired until all the modules in the bag have been played. At that moment all the modules are replaced in the bag and the drawing starts anew. At the end of the game the player who won the most points is the game winner. If two or more players have an equal amount of points tie-breaking plays should determine the winner.

Figure 42:
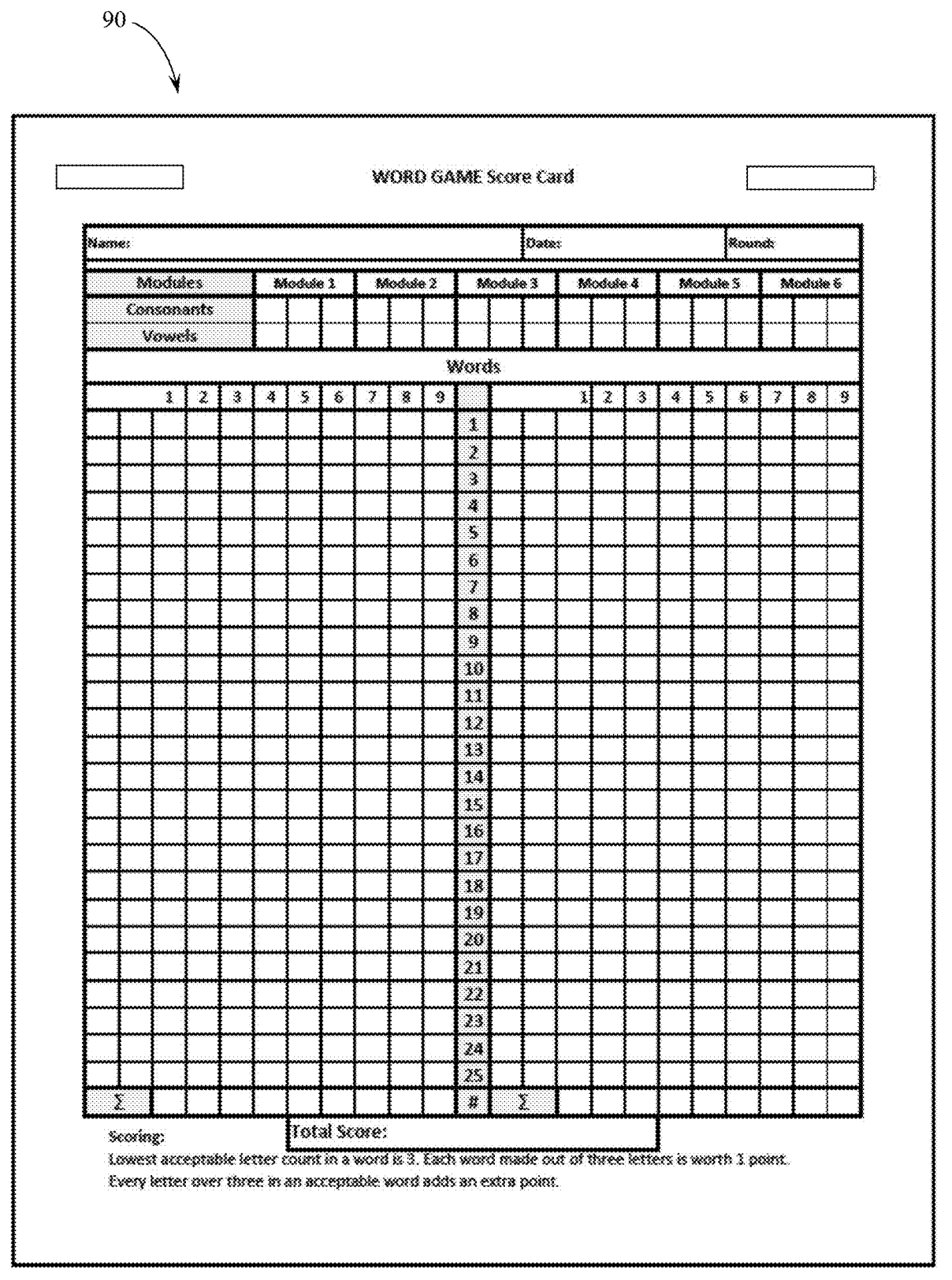

The Construct a Word Game (FIG. 42)

This is a more advanced game level in which a word is selected and each player spells it with letters from their modules. Each player uses a game score card 90 as shown in FIG. 42. All modules (FIGS. 1-36) are placed in the opaque bag. From the beginning the players determine how many rounds will be in the game. It is suggested that the number of rounds matches the number of players or a multiple thereof. One of the players is selected as referee either for the entire game or the players will take turns being referee for each round. The referee makes the final decision in any letter dispute. The game includes a number (preferably five) of pre-established lists with the most common words made out of four, five, six, seven, and eight letters. Words with fewer letters make the game shorter.

The referee selects a word from one of the lists (preferably with more letters than players). The players write the word in the appropriate "Words" box on the score card 90. The players take turns to draw one module each from the bag. Once a player draws a module he/she has half a minute (preferably) to identify its letters and try to match them with the letters contained in the selected word. If there are matching letters, the player announces them, circles the letters on his/her score card 90, and places the module in front on the table. If more than one letter is found in one module all those letters are crossed with an X and circled for double points. All other players cross the respective letters on their score cards with one diagonal slash. If there are no useful letters on the module, the module is placed in a common area on the table and the game continues with the next player drawing a module.

The next player is allowed to inspect the modules placed in the common area before drawing a new module. If a letter that was not called out is found in a previously drawn module the player circles the letter according to the rules, places the module in front on the table, and proceeds to draw a new module. If the module contains a new letter the player follows the same rules. If the player draws a previously drawn letter circles it on the personal score card. If there are multiple previously drawn letters in that module the player changes the slash to an X and circles the letters. The rest of the players do nothing. Modules placed in front of a player cannot be inspected by other players.

The points are awarded as follows: circled letters with or without a slash—one point; circled and crossed with an X letters—two points; letters crossed with one slash—zero points. When all the letters spelling the word have been drawn, the round ends, but only after every player has a turn to draw a module. The winner of the round is the player with the most points. If there are multiple players with equal number of points the player with most double points wins. If equality is still maintained, all those players will score a victory in that round. After each round all the modules are replaced in the bag. At the end of the game the player who won the most rounds is the game winner. If more players share the number of wins the player with the most total points is declared the winner of the game.

Further Game Variations

The 3-D letter modules can be used in word games played in additional alternative ways as described below. Once a choice of game is made the players receives their score cards specific to the play selected. In one alternate embodiment, each player receives a word game score card that has at the top, letter boxes for six modules. There is a line of boxes for consonants and one for vowels. For the modules representing only consonants each player can choose any vowel and list it in its box.

The lowest acceptable letter count in a word is three. Words that increase their letter count by adding an "s" are not accepted. Only one form of a verb is accepted. Proper nouns and slang words are not accepted. One draw of several modules for all players occurs with all modules placed initially in the bag. From the beginning the players determine how many rounds will be in the game. It is suggested that the number of rounds matches the number of players or a multiple of it. One of the players is selected as referee either for the entire game or the players will take turns being referee for each round. The referee decides how many modules will be drawn for each round (minimum three and maximum six). At the end of each round the referee validates the correct words and the total score. The referee makes the final decision in any letter dispute.

The number of modules agreed upon are drawn from the bag and laid on the table. Each player inspects each module for a set amount of time (recommended half a minute) and writes down in its box all the letters that can be visually detected. When all the modules have been inspected by all players the round starts. It is suggested that for every module three to five minutes of play should be added. For the allotted time interval the players should make as many words with the letters detected as possible. There are preferably fifty places for words having up to eleven letters on one face of the score card. If needed, listing the words can be continued on reverse. Lowest acceptable letter count in a word is three. Each word made out of three letters is worth one point. Every letter over three in an acceptable word adds an extra point.

At the end of the set time the player with the most points wins. If the highest number of points is shared by more players, the player with the longest words wins. If equality is still maintained, all those players will score a victory in that round. After each round all the modules are replaced back in the bag. At the end of the game the player who won the most rounds is the game winner. If more players share the number of wins the player with the most total points is declared the winner of the game.

Although the present invention has been described in connection with specific examples of letters from the Latin or Roman alphabet, those skilled in the art will recognize that other alphabets and languages may be used without departing from the spirit and scope of the invention. In addition, the examples provided should not be construed as limiting the 3-D letter combinations possible for any given module. Other modules, even within the group of letters within the Latin alphabet, are certainly possible and may be included within the game method of play. A further variation of the game may include numerals on separate modules or in combination with letter modules.

The modules themselves may be constructed of any of a variety of rigid or partially resilient materials such as resins, plastics, wood, foam, and other materials with similar rigidity and mass. Variations in size are also anticipated subject primarily to limitations associated with being easily handled by the players and easily contained within an opaque bag of medium size. Variations in the configuration of the game case or storage container are also anticipated. The game modules may be stored in the bag itself or in a different container. The storage container may be cylindrical or box shaped, and hard sided or soft sided. The game apparatus may also contain one or more stands (not shown in the drawing figures) onto which the players might place the modules to arrange and view them during the play of the game.

While the preferred embodiment of the construction of the modules herein has been presented as solid cube-shaped blocks with large cutouts in various directions that serve to form the various letters when viewed from different angles, other means for providing the same visual impressions are anticipated. Each module might, for example, be constructed of a clear acrylic or glass block with opaque inclusions forming the letter patterns. Other variations as to game component construction and game rules will be apparent to those skilled in the art of games and educational tools.

I claim:

1. A game apparatus assembly for implementation of a competitive game of skill played between two or more players, the skill comprising an ability to discern two-dimensional alphanumeric characters from open structure, visually complex three-dimensional objects, the game apparatus comprising:

a plurality of open structure three-dimensional letter modules, each letter module having maximum height, width, and depth dimensions that overall approximate a cube in shape, each letter module further configured to visually present two, three, or four separate discernable alphanumeric characters only when the module is specifically oriented and/or is viewed from a specific angle, and to visually present structures generally indiscernible as alphanumeric characters when the module is viewed in other orientations.

2. The game apparatus of claim 1 further comprising an opaque container for receiving and retaining the plurality of open structure three-dimensional letter modules, the opaque container allowing the two or more players to blindly select one or more letter modules at a time during the play of a game.

3. The game apparatus of claim 1 wherein each of the plurality of open structure three-dimensional letter modules presents three separate discernable alphanumeric characters.

4. The game apparatus of claim 3 wherein the plurality of open structure three-dimensional letter modules include modules selected from a group consisting of: an AJT module; a BEG module; a CUX module; a DNU module; an EMH module; an SAT module; a GCO module; an HOB module; a JET module; a KDO module; an LSE module; an MUG module; an NCE module; an OHM module; a RED module; a QUD module; a PER module; an SRE module; a TAP module; a UAO module; a VUH module; an XAV module; a YEH module; an FEZ module; an EFT module; an AUL module; an ELM module; an HEF module; an HUT module; an REN module; a DEG module; an NOD module; a PEL module; an NOE module; an FUN module; and an HEB module.

5. The game apparatus of claim 1 further comprising a plurality of playing cards, each playing card comprising alphanumeric indicia corresponding to at least one discernable alphanumeric character on at least one of the plurality of open structure three-dimensional letter modules.

6. The game apparatus of claim 1 further comprising a plurality of bingo-type cards presenting an array of alphanumeric characters corresponding to the discernable alphanumeric characters represented in the plurality of open structure three-dimensional letter modules; and a plurality of markers positionable on individual alphanumeric indicia on each bingo-type card.

7. The game apparatus of claim 1 wherein the alphanumeric characters comprise alphabetic characters.

8. The game apparatus of claim 1 wherein the alphanumeric characters comprise numeric characters.

9. The game apparatus of claim 1 wherein the overall approximate cube shape of each open structure letter module defines at least six specific orientations where alphanumeric characters are potentially discernable, each specific orientation visually presenting structural elements of the letter module that potentially contribute to the formation of a visually discernable alphanumeric character, and visually hiding structural elements of the letter module that detract from the formation of the visually discernable alphanumeric character.

10. The game apparatus of claim 9 wherein the at least six specific orientations define axes for visualization of alphanumeric characters and rotation of the open structure letter module about one such defined axis presents two or more distinct alphanumeric characters.

11. A game apparatus assembly for implementation of a competitive game of skill played between two or more players, the skill comprising an ability to discern two-dimensional alphanumeric characters from open structure, visually complex three-dimensional objects, the game apparatus comprising:

a plurality of open structure three-dimensional letter modules, each letter module having maximum height, width, and depth dimensions that overall approximate a cube in shape, each letter module further configured to visually present three separate discernable alphanumeric characters only when the module is specifically oriented and/or is viewed from a specific angle, and to visually present structures generally indiscernible as alphanumeric characters when the module is viewed in other orientations;

wherein the overall approximate cube shape of each open structure letter module defines six specific orientations where alphanumeric characters are potentially discernable, at least two of the specific orientations visually presenting structural elements of the letter module that contribute to the formation of a visually discernable alphanumeric character, and visually hiding structural elements of the letter module that detract from the formation of the visually discernable alphanumeric character.

* * * * *